(12) United States Patent
Vasudeva

(10) Patent No.: US 6,957,937 B2
(45) Date of Patent: Oct. 25, 2005

(54) SPADE BITS WITH ANGLED SIDES

(75) Inventor: Kailash C. Vasudeva, Waterloo (CA)

(73) Assignee: Maxtech Manufacturing Inc., Waterloo (CA)

(*) Notice: Subject to any disclaimer, the term of this patent is extended or adjusted under 35 U.S.C. 154(b) by 175 days.

(21) Appl. No.: 10/077,884

(22) Filed: Feb. 20, 2002

(65) Prior Publication Data

US 2002/0127071 A1 Sep. 12, 2002

Related U.S. Application Data

(60) Provisional application No. 60/269,346, filed on Feb. 20, 2001.

(51) Int. Cl.$^7$ ................................................ B23B 51/02
(52) U.S. Cl. ...................... 408/211; 408/213; 408/225; 408/228
(58) Field of Search ................................ 408/211, 212, 408/213, 214, 223, 224, 225, 227, 228, 230

(56) References Cited

U.S. PATENT DOCUMENTS

| | | | |
|---|---|---|---|
| 2,627,292 A | * | 2/1953 | Kronwall ..................... 408/213 |
| 2,681,673 A | * | 6/1954 | Mackey ....................... 408/224 |
| 2,692,627 A | * | 10/1954 | Stearns ........................ 408/211 |
| 2,752,965 A | * | 7/1956 | Mackey ....................... 408/211 |
| 3,991,454 A | | 11/1976 | Wale |
| 3,997,279 A | * | 12/1976 | Porter ......................... 408/211 |
| 4,330,229 A | | 5/1982 | Croydon |
| 4,527,449 A | * | 7/1985 | Sydlowski et al. ......... 76/108.1 |
| 4,682,917 A | | 7/1987 | Williams, III et al. |
| 4,950,111 A | | 8/1990 | Thomas |
| 5,061,127 A | | 10/1991 | Thomas |
| 5,221,166 A | | 6/1993 | Bothum |
| 5,291,806 A | | 3/1994 | Bothum |
| 5,452,970 A | * | 9/1995 | Sundstrom et al. ......... 408/211 |
| 5,649,796 A | | 7/1997 | Durney |
| 5,697,738 A | | 12/1997 | Stone et al. |
| 5,700,113 A | | 12/1997 | Stone et al. |
| 6,227,774 B1 | * | 5/2001 | Haughton et al. ........... 408/225 |
| 6,354,773 B1 | * | 3/2002 | Konen ......................... 408/213 |
| 2001/0031178 A1 | * | 10/2001 | Remke et al. ............... 408/1 R |
| 2004/0052594 A1 | * | 3/2004 | Singh .......................... 408/211 |

FOREIGN PATENT DOCUMENTS

WO    WO 98/05459    2/1998

OTHER PUBLICATIONS

Turbo Bit advertisement, Kennametal, 2000.

* cited by examiner

Primary Examiner—Daniel W. Howell
(74) Attorney, Agent, or Firm—Borden Ladner Gervais LLP; Jeffrey W. Wong

(57) ABSTRACT

A spade drill bit has a shaft and a spade head portion arranged on the shaft. The head portion has a rearward facing bottom edge, two longitudinal sides and a forward facing cutting edge. The cutting edge has a pointed, generally triangularly shaped tip and outer ends. The longitudinal sides of the head portion are bent along a bend in a direction of rotation of the drill bit during operation, so that the outer ends are bent forwards in the rotating direction. The bend runs from a first position at one of the longitudinal sides, closer to the bottom edge than to the cutting edge, and to a second position at the cutting edge between the outer end and the tip.

14 Claims, 18 Drawing Sheets

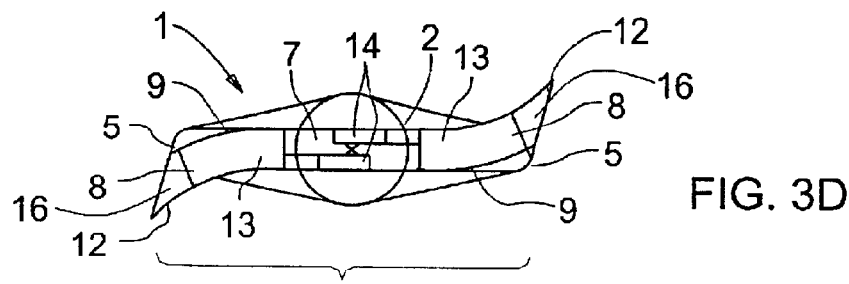
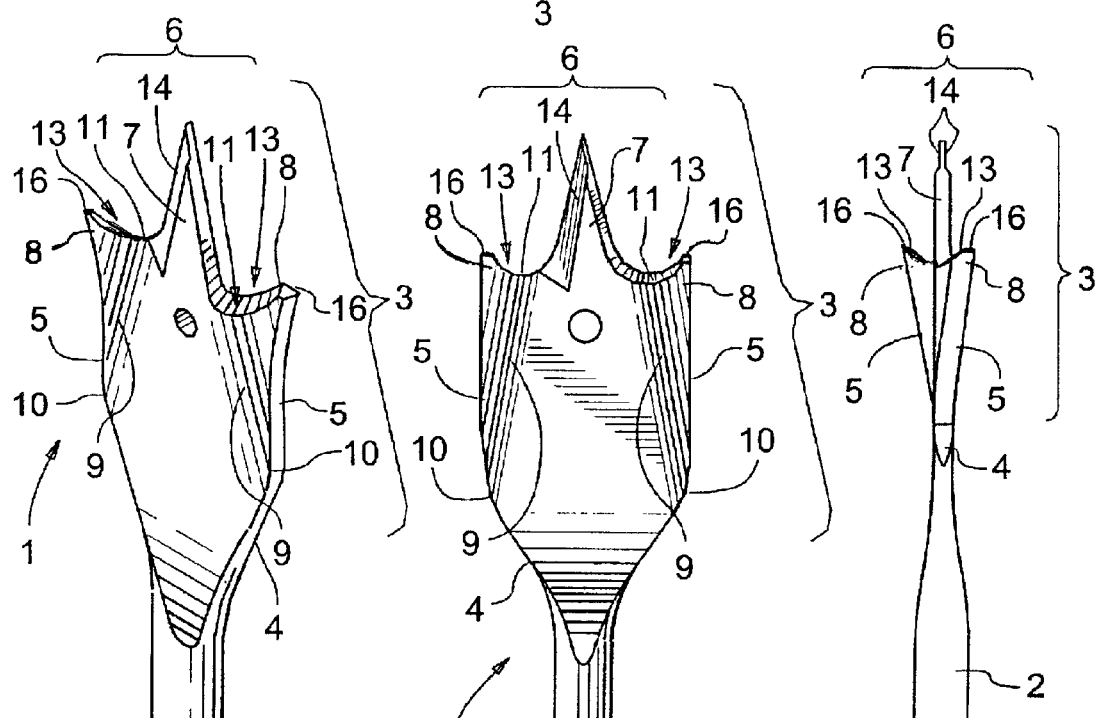
FIG. 3A
FIG. 3B
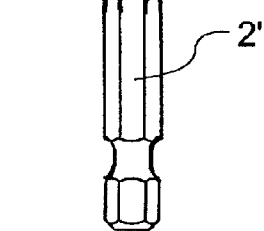
FIG. 3C
FIG. 3D

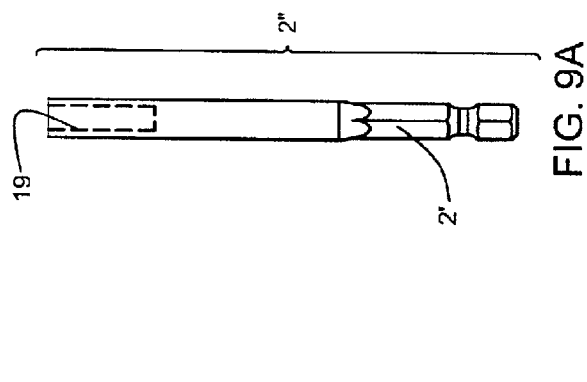
FIG. 9A
FIG. 9B
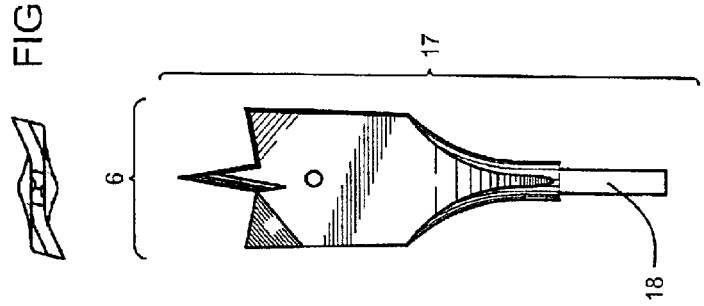
FIG. 8C
FIG. 8A
FIG. 8B
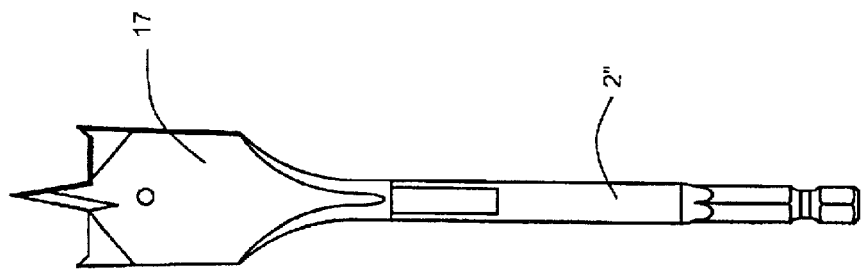
FIG. 10E
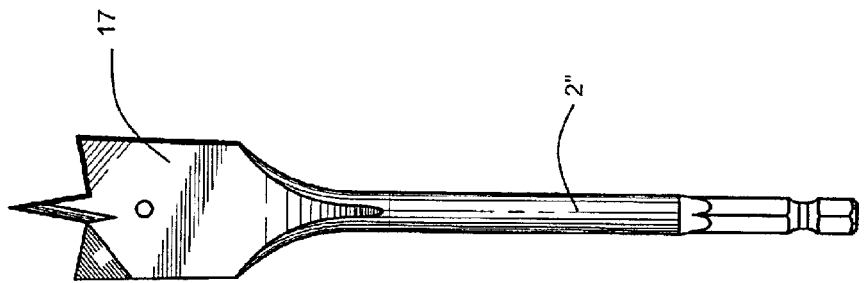
FIG. 10F

SPADE BITS WITH ANGLED SIDES

REFERENCE TO RELATED APPLICATION

This is a formal application based on and claiming the benefit of U.S. provisional patent application No. 60/269,346, filed Feb. 20, 2001.

FIELD OF THE INVENTION

The present invention generally relates to spade drill bits. In particular, the invention relates to bit configurations adapted to provide enhanced drill hole quality with lowered power requirements and better chip removal.

DESCRIPTION OF THE PRIOR ART

Traditional spade drill bits 100 usually have a point 110 and two cutting surfaces 120 generally perpendicular to the material to be cut, see FIGS. 1A to 1D. To enhance the cut surface of the hole, they may also have edge spurs 130 arranged at the outermost tips of the spade, as is shown in FIGS. 1E to 1G. Spade bits of this general design are shown in, for instance, WO 98/05459, U.S. Pat. No. 5,221,166, U.S. Pat. No. 5,291,806, U.S. Pat. No. 5,697,738, U.S. Pat. No. 5,700,113 and U.S. Pat. No. 5,061,127. During operation, the point centres the drill bit during boring. Subsequently, the edge spurs engage the material to be cut, defining the perimeter of the bore before the portions between the centre point and the spurs are excavated. Spade bits described in these documents all share the apparent disadvantage that the material to be cut away to form the hole is cut in a relatively large chip, one on each side of the central point. This requires a relatively large power input to the spade drill bit, and may also cause excessive vibration of the spade drill bit during boring operations. Further, there is a risk of damaging the material to be cut when the drill bit exits the material on the side opposite the bore starting side of the material.

SUMMARY OF THE INVENTION

It is an object of the invention to provide a spade bit which overcomes the mentioned drawbacks, and which has enhanced chip removal properties.

In the invention, a spade drill bit has a shaft and a spade head portion arranged on the shaft. The head portion has a rearward facing bottom edge, two longitudinal sides and a forward facing cutting edge having a pointed, generally triangularly shaped tip and outer ends. The longitudinal sides of the head portion are bent in the direction of rotation, so that the outer ends of the cutting edge are bent forwards in the rotating direction. The bend runs from a position at the longitudinal side of the spade head portion, arranged closer to the bottom edge of the head portion than the cutting edge of the head portion, to the cutting edge somewhere between the outer end of the cutting edge ant the tip.

Preferably, edge spurs are arranged at the outer ends of the cutting edge.

The cutting edge portions arranged between the edge spurs and the tip are either substantially flat or generally U-shaped.

Preferably, the longitudinal sides have serrations to aid in the chip removal from the side of the drilled hole and to create a smoother side.

The tip advantageously has reliefs arranged in the cutting direction. The reliefs preferably run along at least a portion of the bend.

BRIEF DESCRIPTION OF THE DRAWINGS

In order that the invention may be more clearly understood, the preferred embodiment thereof will now be described in detail by way of example, with reference to the accompanying drawings, in which:

FIG. 3A is an elevational perspective view of a second embodiment of a spade drill bit according to the invention;

FIG. 3B is a plan view of the second embodiment of the spade drill bit of FIG. 3A;

FIG. 3C is a side view of the second embodiment of the spade drill bit of FIG. 3A;

FIG. 3D is a top view of the second embodiment of the spade drill bit of FIG. 3A;

FIG. 8A is a plan view of a separate spade drill bit head according to the invention;

FIG. 8B is a bottom view of the spade drill bit head of FIG. 8A;

FIG. 8C is a top view of the spade drill bit of FIG. 8A;

FIG. 9A is a plan view of a separate spade drill bit stem according to the invention;

FIG. 9B is a top view of the spade drill bit stem of FIG. 9A;

FIG. 10E is a plan view of the joined spade drill bit head and stem of a drill bit as shown in FIG. 10A, showing the joint in dashed lines;

FIG. 10F is a plan view of the joined spade drill bit head and stem of a drill bit as shown in FIG. 10A;

DETAILED DESCRIPTION OF THE PREFERRED EMBODIMENT

Figure 1D:
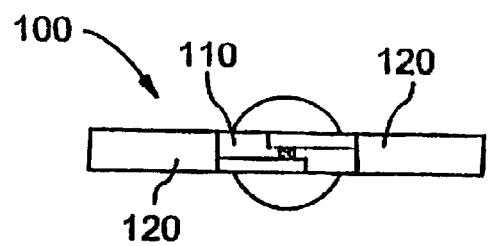
FIG. 1D is a top view of the spade drill bit of FIG. 1A.
Figure 1A:
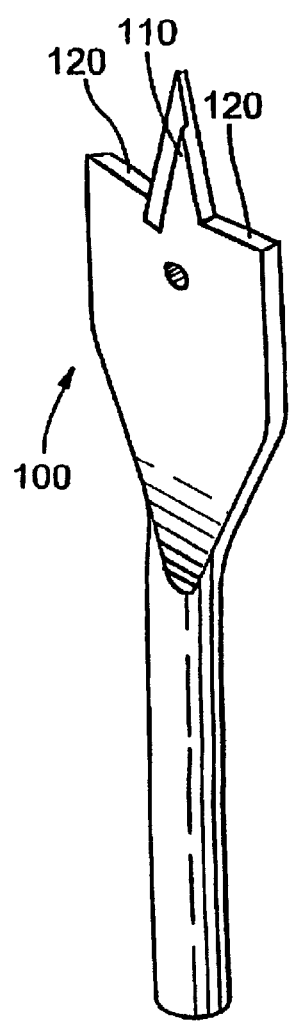
FIG. 1A is an elevational perspective view of a spade drill bit according to Prior Art.
Figure 1B:
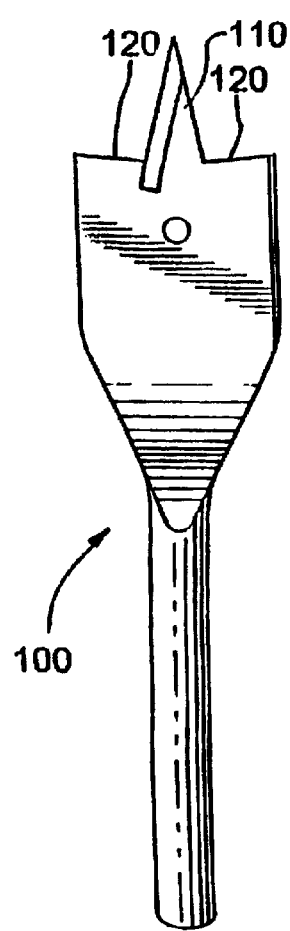
FIG. 1B is a plan view of the spade drill bit of FIG. 1A.
Figure 1C:
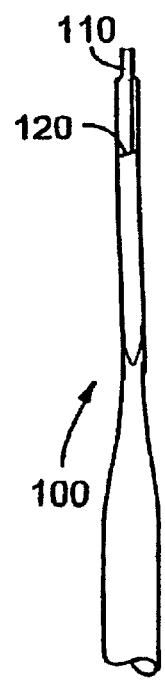
FIG. 1C is a side view of the spade drill bit of FIG. 1A.
Figure 1G:
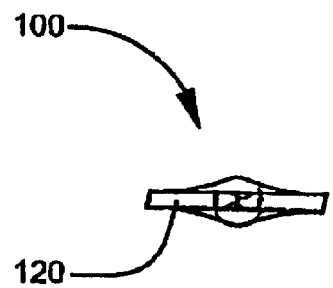
FIG. 1G is a top view of the spade drill bit of FIG. 1E.
Figure 1E:
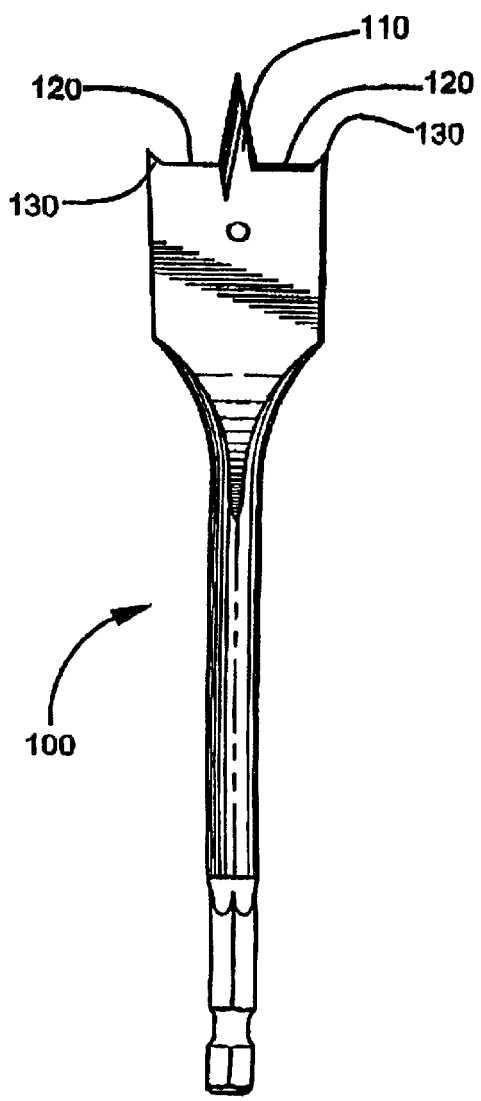
FIG. 1E is a plan view of a further spade drill bit according to Prior Art, having edge spurs.
Figure 1F:
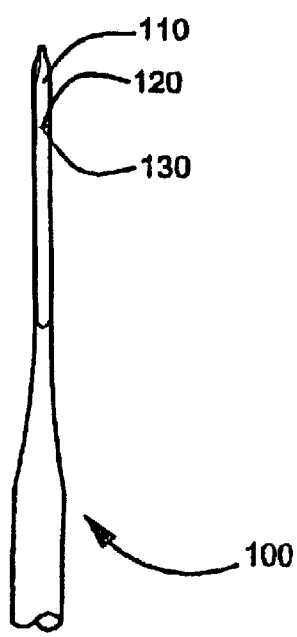
FIG. 1F is a side view of the spade drill bit of FIG. 1E.
Figures 2A, 2B, 2C, 2D:
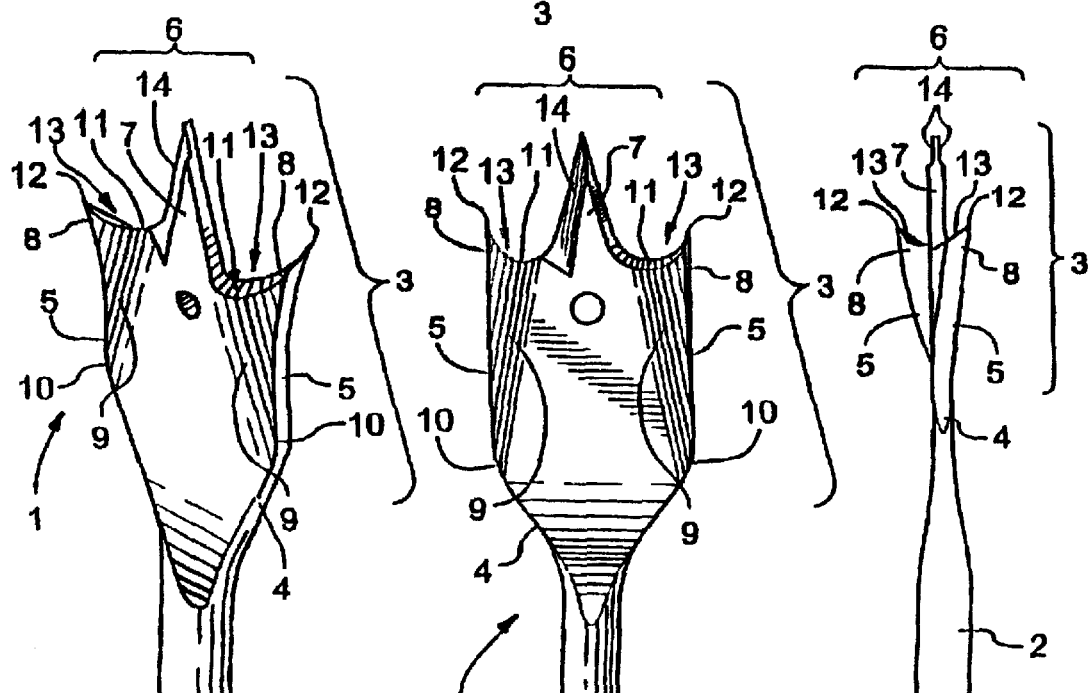
FIG. 2A is an elevational perspective view of a first embodiment of a spade drill bit according to the invention.
FIG. 2B is a plan view of the first embodiment of the spade drill bit of FIG. 2A.
FIG. 2C is a side view of the first embodiment of the spade drill bit of FIG. 2A.
FIG. 2D is a top view of the first embodiment of the spade drill bit of FIG. 2A.

A first embodiment of a spade drill bit 1 according to the invention is shown in FIGS. 2A to 2J. The spade drill bit 1 has a shaft 2 and a spade head portion 3 arranged on the shaft. The shaft is intended to be fastened in a hand or power tool (not shown), and may have any suitable shape cooperating with the hand or power tool, for instance substantially cylindrical (FIG. 2A) or with a hex end portion 2' (FIG. 2B).

The head portion 3 has a rearward facing bottom edge 4, two longitudinal sides 5 and a forward facing cutting edge 6 having a pointed, generally triangularly shaped tip 7 and outer ends 8. The longitudinal sides of the head portion are bent along a bend 9, in the direction of rotation of the spade drill bit during operation, so that the outer ends of the cutting edge are bent forwards in the rotating direction. The bend 9 runs from a first position 10 at the longitudinal side of the spade head portion to a second position 11 on the cutting edge somewhere between the outer end of the cutting edge and the tip. The first position is closer to the bottom edge of the head portion than the cutting edge of the head portion. The tip has reliefs 14 arranged on the side of the tip facing the direction of rotation, for breaking the cut chip up into smaller fragments during the boring operation. This enhances the chip removal properties of the spade drill bit 1.

Preferably, edge spurs 12 are arranged at the outer ends 8 of the cutting edge 6. These spurs engage the material to be cut at the outer periphery of the hole and smooth the surface of the hole, in a known way.

Figure 2G:
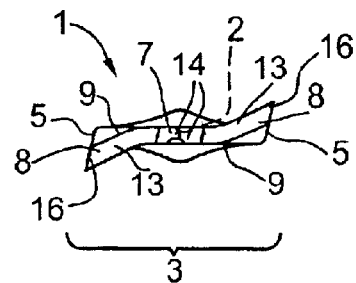
FIG. 2G is a side view of the first embodiment of the spade drill bit of FIG. 2E.
Figure 2E:
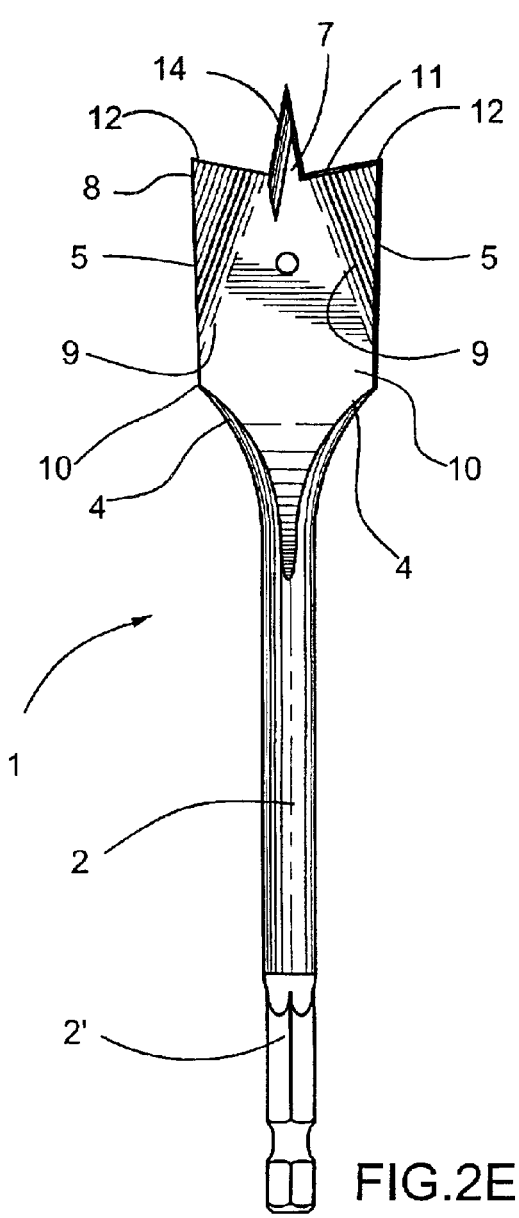
FIG. 2E is an elevational perspective view of a further variant of the first embodiment of a spade drill bit according to the invention.
Figure 2F:
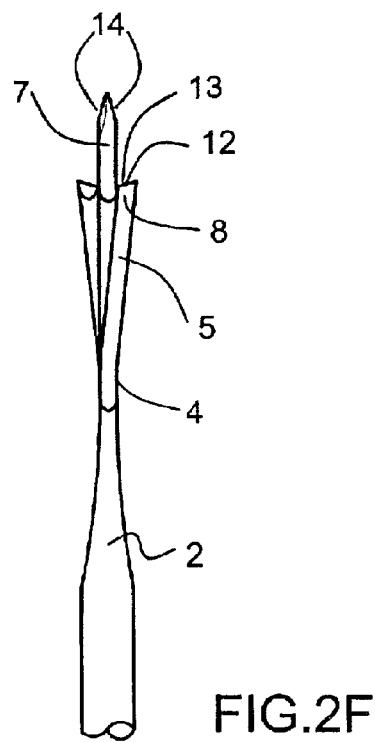
FIG. 2F is a plan view of the first embodiment of the spade drill bit of FIG. 2E.

The cutting edge 6 further advantageously comprises arced cutting portions 13 arranged between the outer ends 8 and the tip 7 (FIGS. 2A to 2D). The arced cutting portions are preferably generally U-shaped, to divide the cutting operation of the hole between the middle of the hole and the outer edge of the hole into a plurality of minor cuts (along the arced cutting edge). Alternatively, the cutting edge 6 has a straight second portion 11, as shown in FIGS. 2E to 2G.

Figure 2J:
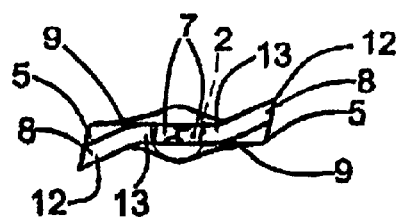
FIG. 2J is a side view of the first embodiment of the spade drill bit of FIG. 2H.
Figure 2H:
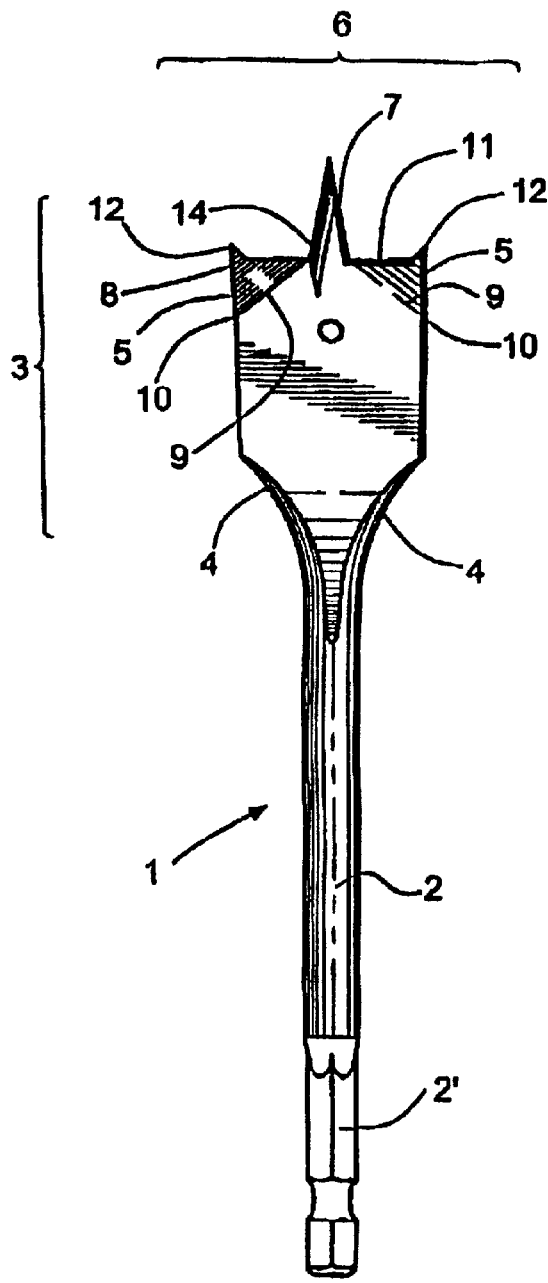
FIG. 2H is an elevational perspective view of still a further variant of the first embodiment of a spade drill bit according to the invention.
Figure 2I:
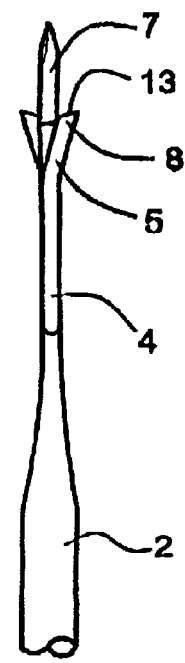
FIG. 2I is a plan view of the first embodiment of the spade drill bit of FIG. 2H.

FIGS. 2A to 2G show drills where the longitudinal sides 5 have a bend 9, which runs along a relatively long portion of the head 3. Alternatively, as is shown in FIGS. 2H to 2J, the bends 9 run along a relatively shorter portion of the head, for enhanced chip break-up (see further description related to FIGS. 7A to 7F below).

A second embodiment of a spade drill bit 1 according to the invention is shown in FIGS. 3A to 3D. All technical features that are the same as shown earlier for FIGS. 2A to 2D retain their reference numerals. This embodiment is similar to the first embodiment, but the outer ends 8 have flat portions 16, i.e. portions that are substantially perpendicular to the material surface to be cut. This embodiment is used primarily for spade drill bits used to cut harder materials, where the wear of the drill bit has to be minimized.

A third embodiment of a spade drill bit 1 according to the invention is shown in FIGS. 4A to 4D. All technical features that are the same as shown earlier for FIGS. 2A to 2D retain their reference numerals. This embodiment is similar to the first embodiment, but the two longitudinal sides 5 have serrations 15 along at least part of their length. Alternatively, only one of the longitudinal sides have serrations. The serrations enhance the chip removal from the side of the drilled hole and also creates a smoother side.

Figures 5A, 5B:
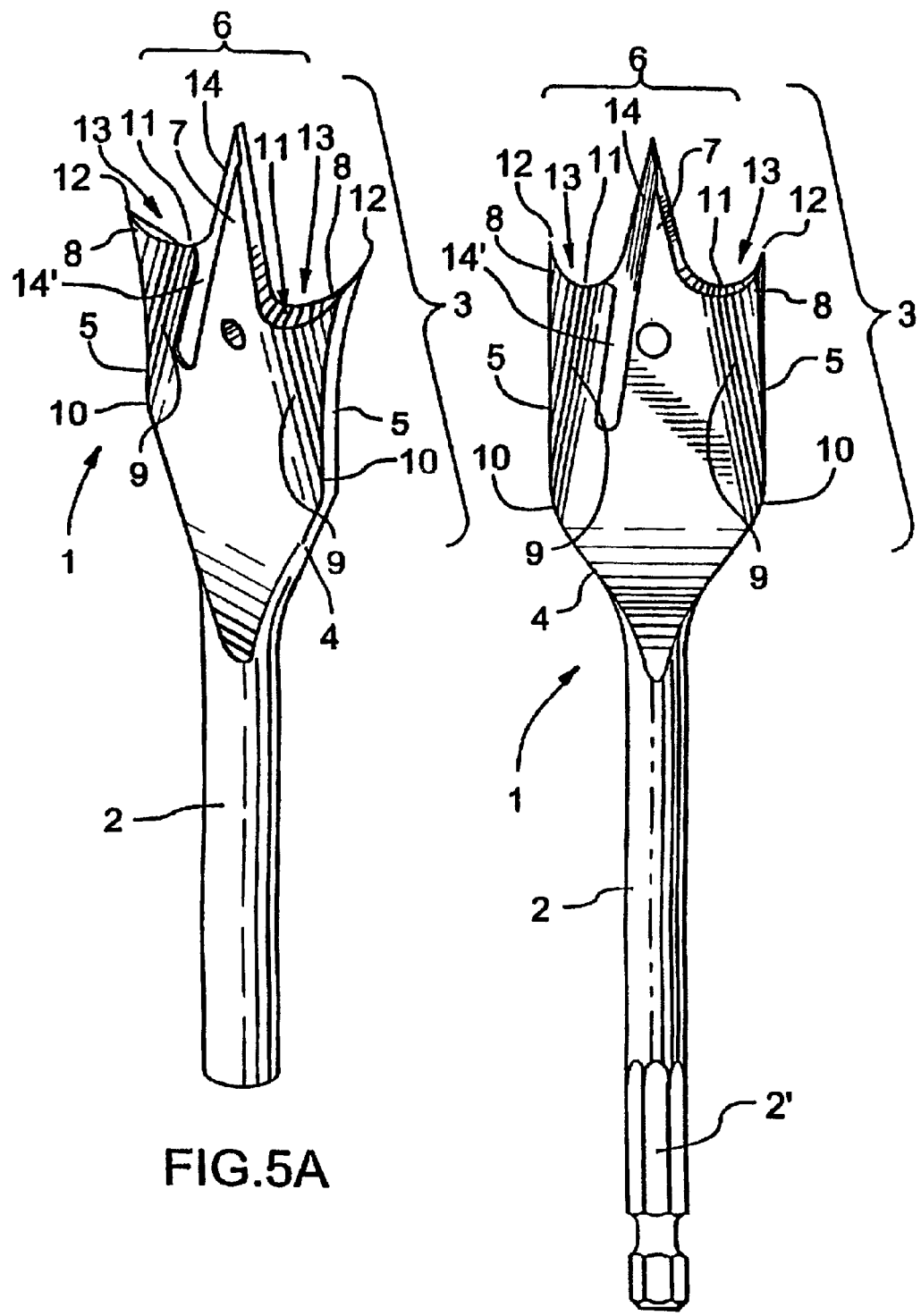
FIG. 5A is an elevational perspective view of a fourth embodiment of a spade drill bit according to the invention.
FIG. 5B is a plan view of the fourth embodiment of the spade drill bit of FIG. 5A.

A fourth embodiment of a spade drill bit 1 according to the invention is shown in FIGS. 5A and 5B. All technical features that are the same as shown earlier for FIGS. 2A to 2D retain their reference numerals. The difference between the second embodiment and the first embodiment is that the reliefs 14' of the fifth embodiment run from the tip 7 and along a portion of the bend 9. This further enhances the chip removal properties of the spade drill bit 1.

Figures 6A, 6B:
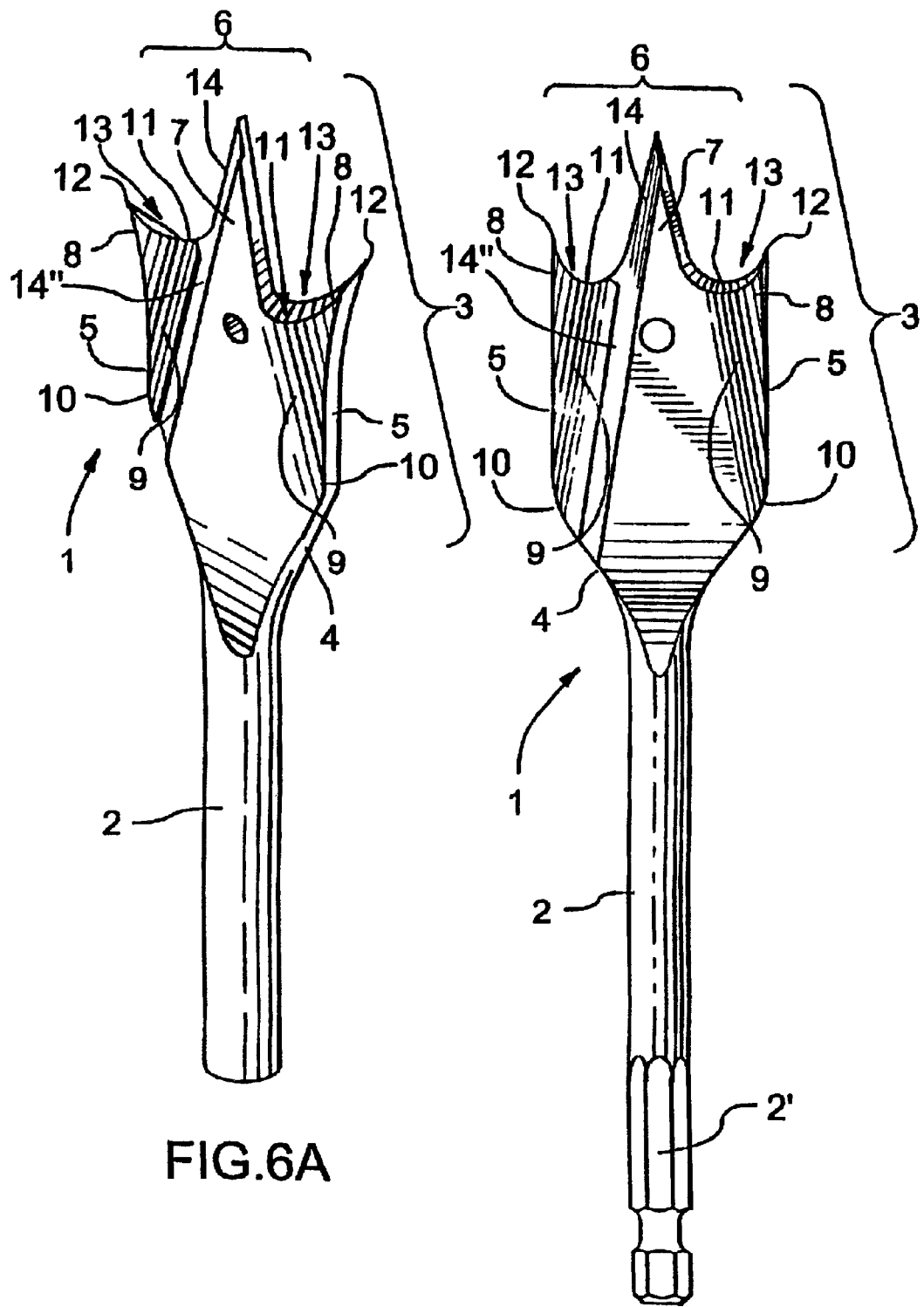
FIG. 6A is an elevational perspective view of a fifth embodiment of a spade drill bit according to the invention.
FIG. 6B is a plan view of the fifth embodiment of the spade drill bit of FIG. 6A.

A fifth embodiment of a spade drill bit 1 according to the invention is shown in FIGS. 6A and 6B. All technical features that are the same as shown earlier for FIGS. 2A to 2D retain their reference numerals. This embodiment is similar to the fourth embodiment, but the reliefs 14" run the full length of the bend 9. This even further enhances the chip removal properties of the spade drill bit 1.

Figure 7A:
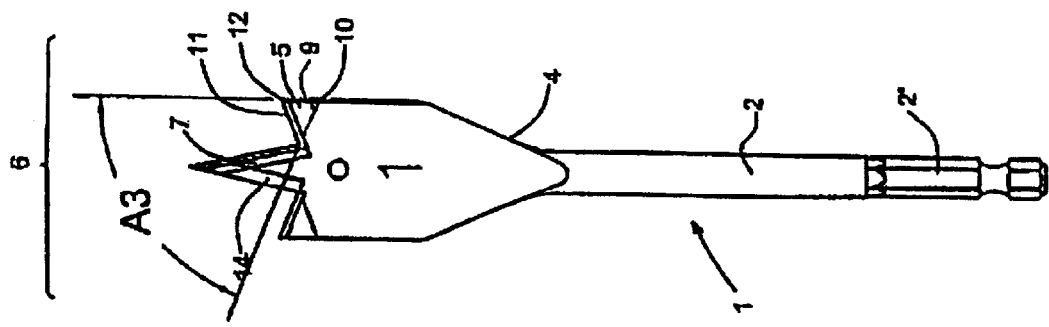
FIG. 7A is a plan view of a spade drill bit according to the invention, showing a first alternative for how the longitudinal sides of the head of the drill bit are bent.
Figure 7B:
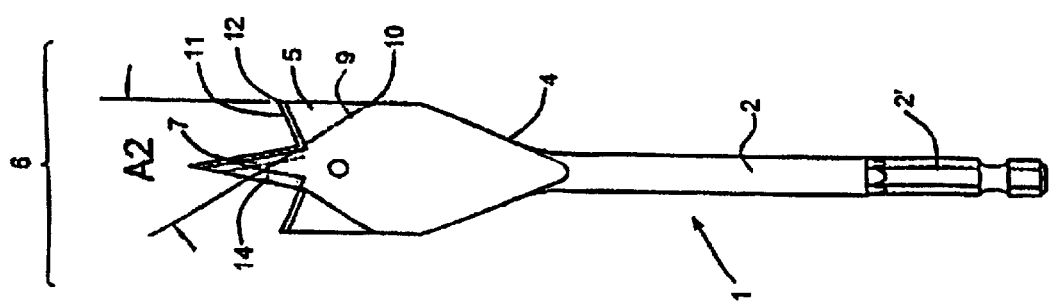
FIG. 7B is a plan view of a spade drill bit according to the invention, showing a second alternative for how the longitudinal sides of the head of the drill bit are bent.
Figure 7C:
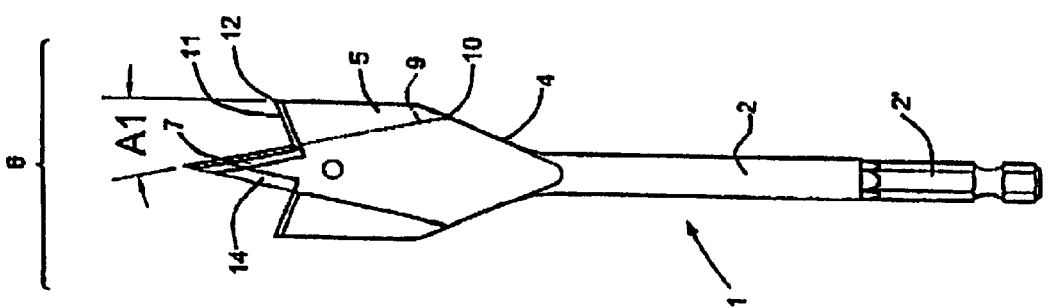
FIG. 7C is a plan view of a spade drill bit according to the invention, showing a third alternative for how the longitudinal sides of the head of the drill bit are bent.
Figure 7F:
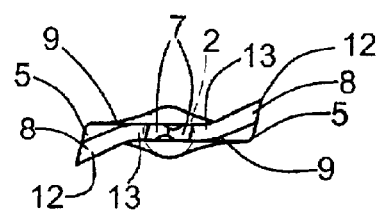
FIG. 7F is a top view of the spade drill bit of FIG. 7D.
Figure 7D:
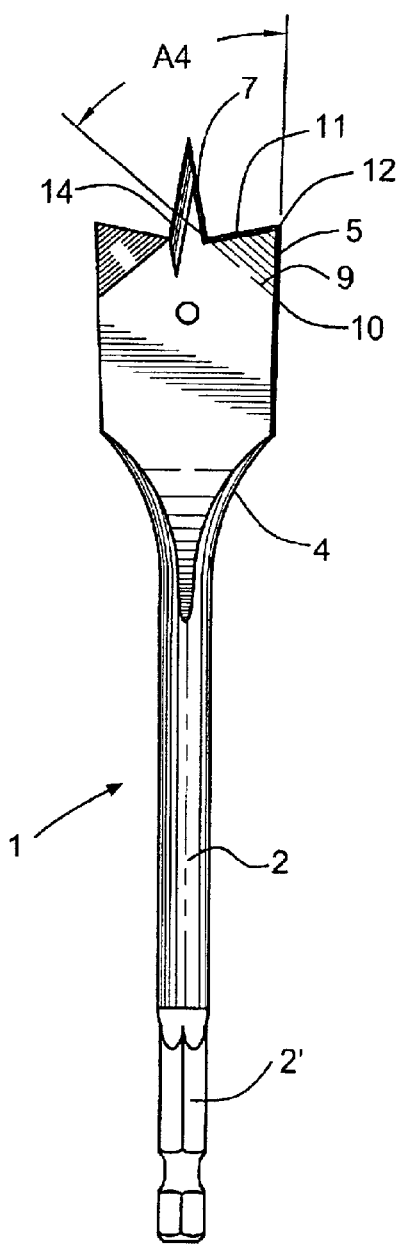
FIG. 7D is a plan view of a spade drill bit according to the invention, showing longitudinal sides of the drill bit head bent close to the top of the head.
Figure 7E:
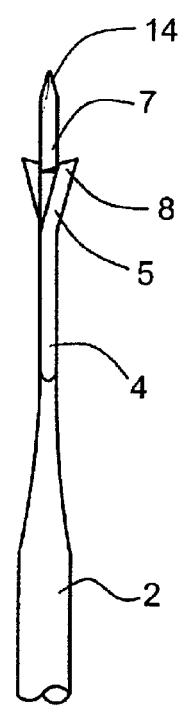
FIG. 7E is a side view of the spade drill bit of FIG. 7D.
Figure 10A:
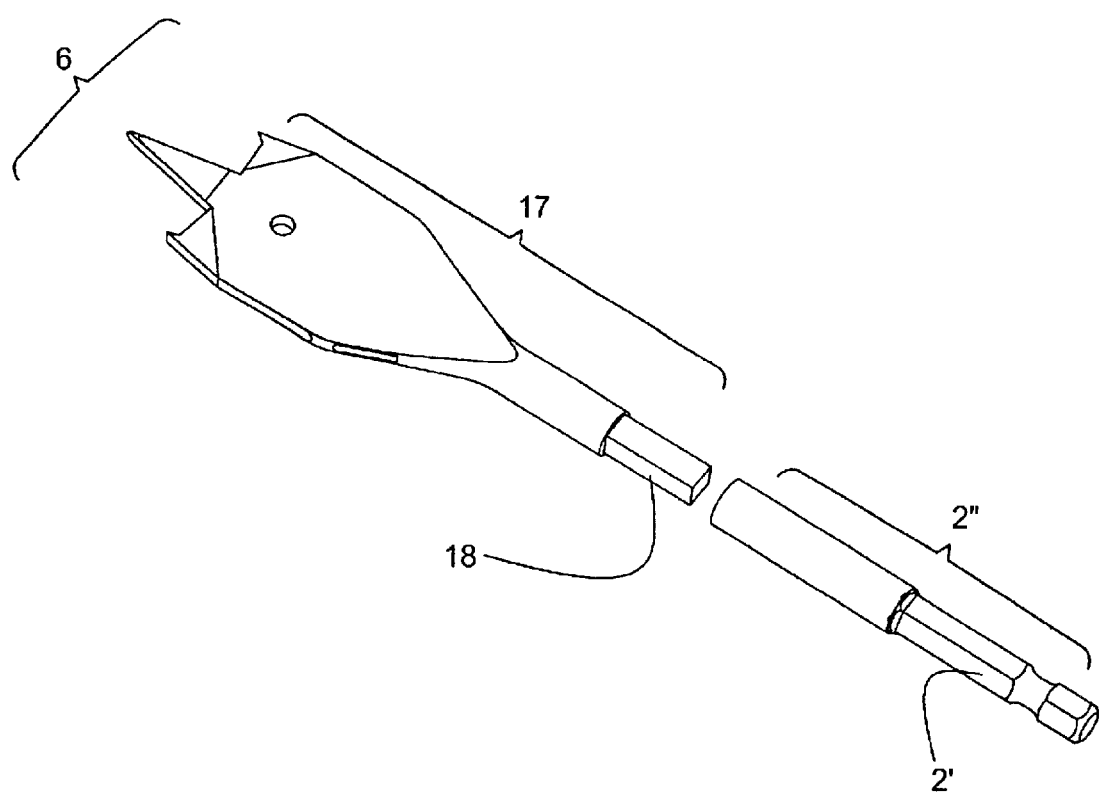
FIG. 10A is an elevational perspective view of the separate spade drill bit head and stem in position to be joined together.
Figure 10D:
FIG. 10D is a top view of the separate spade drill bit head and stem of FIG. 10A.
Figures 10B, 10C:
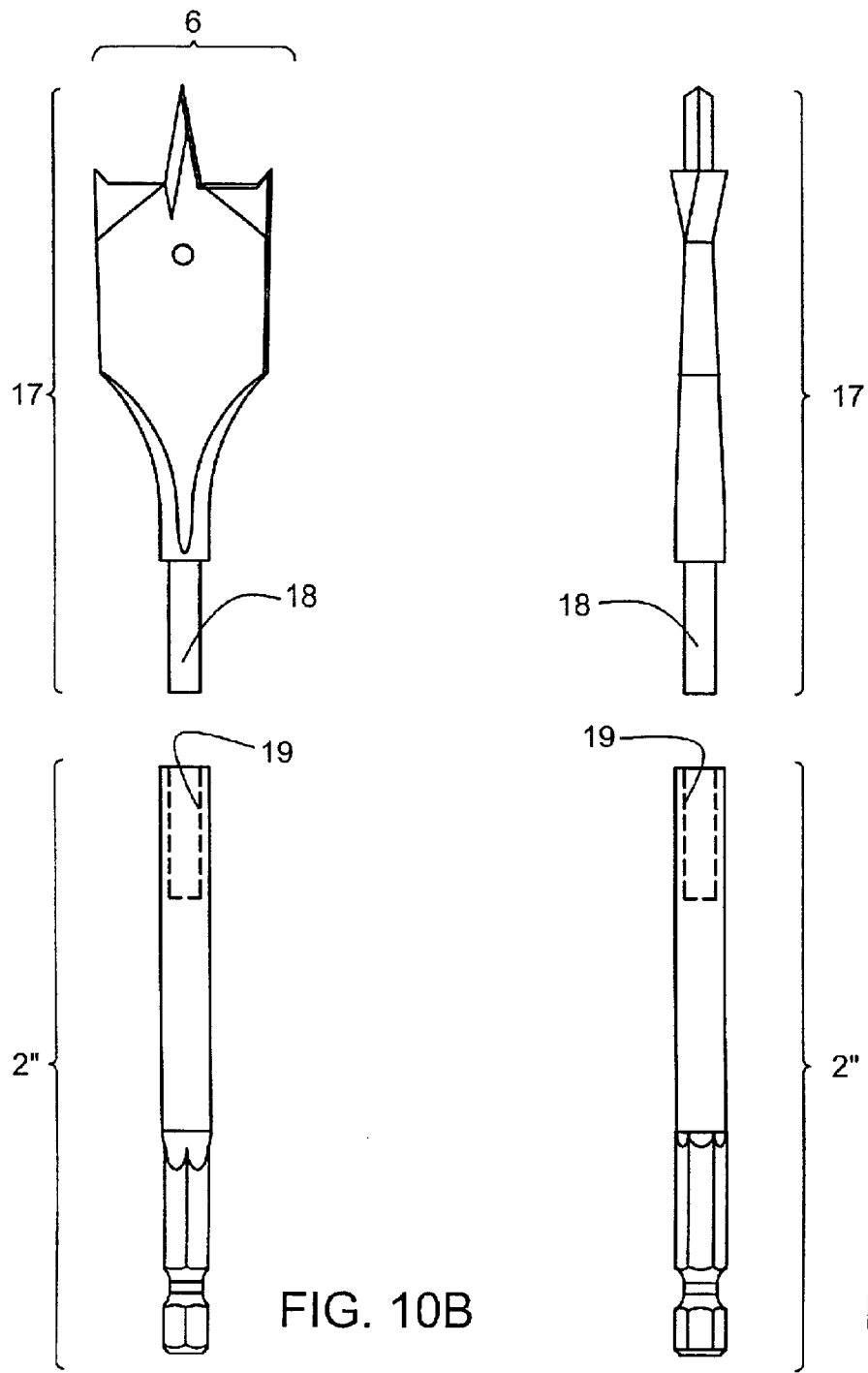
FIG. 10B is a plan view of the separate spade drill bit head and stem of FIG. 10A.
FIG. 10C is a side view of the separate spade drill bit head and stem of FIG. 10A.

FIGS. 7A to 7F illustrate different arrangements of the bend 9 of the longitudinal sides 5 of a spade drill bit according to the invention. All technical features that are the same as shown earlier for FIGS. 2A to 2D retain their reference numerals. FIG. 7A shows a drill head having longitudinal sides 5 with a bend 9, which runs along a relatively long portion of the head from the tip 7 to the first position 10. The chip re moved from the work piece by the cutting edge is thus made to change direction when it encounters the bend, but the transition is relatively gentle since the bend is at a small angle A1 to the longitudinal direction of the drill. A shorter bend 9 is shown in FIG. 7B forming an angle A2 with the longitudinal direction, and an even shorter bend 9 is shown in FIG. 7C forming an angle A3 with the longitudinal direction. The shorter the bend 9, the larger the angle with the longitudinal direction is going to be, and the more abrupt is the chip break-up. Larger angles require more power for drilling. FIGS. 7D to 7F show a "large angle" alternative to the drill bit shown in FIGS. 2E to 2G, the bend 9 forming an angle A4 with the longitudinal direction.

An alternative method of manufacturing drills according to the invention is shown in FIGS. 8A to 10E. A separate head portion 17 is shown in FIGS. 8A to 8C, having a shaped attachment portion 18 opposite the cutting edge 6. The shaped attachment portion has a cross-section, which corresponds to an internal cross-section shape of a mounting hole 19 of separate stem portion 2", as shown in FIGS. 9A and 9B. The cross-section is advantageously rectangular, quadratic, triangular, hexagonal or any similar shape. The separate head portion 17 and the separate stem portion 2" are shown joined together in FIGS. 10F and 10E. Depending upon the degree of bend 9 of the longitudinal sides 5, and the overall shape of the head 3 of the drill 1, it may be difficult and costly to manufacture the drill using conventional processes, such as forging and machining. The separate head portion 17 is advantageously made using powder metallurgical processes, and preferably pre-sintered. The separate stern portion 2" is made using more traditional methods, such as forging and other hot or cold forming techniques, and the two pieces (head and stem) are pressed together and final-sintered. Any grinding and finishing operations can either be done at the pre-sintered or final-sintered stage of the manufacturing process.

Figures 11A, 11B, 11C:
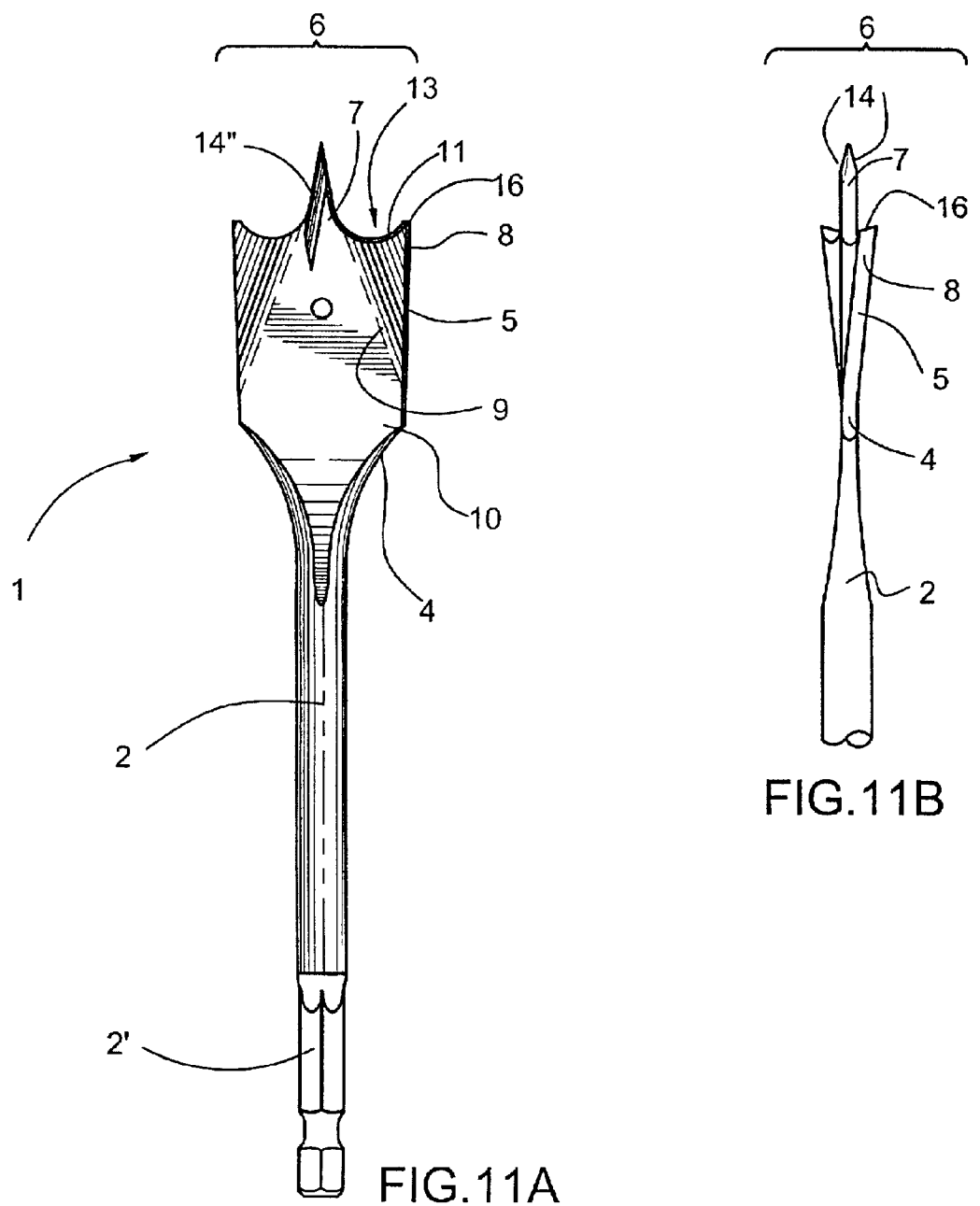
FIG. 11A is a plan view of a further embodiment of a spade drill bit according to the invention, showing a combination of the embodiments shown in FIGS. 3A and 6A.
FIG. 11B is a side view of the spade drill bit of FIG. 11A.
FIG. 11C is a top view of the spade drill bit of FIG. 11A.

FIGS. 11A to 11C shows an embodiment of a spade drill bit according to the invention, which combines the features shown in connection with FIGS. 3A and 6A previously.

Figure 12C:
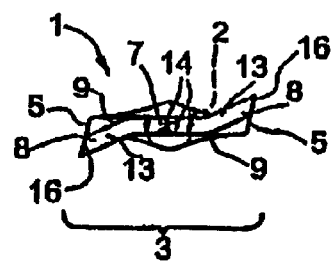
FIG. 12C is a top view of the spade drill bit of FIG. 12A.
Figure 12A:
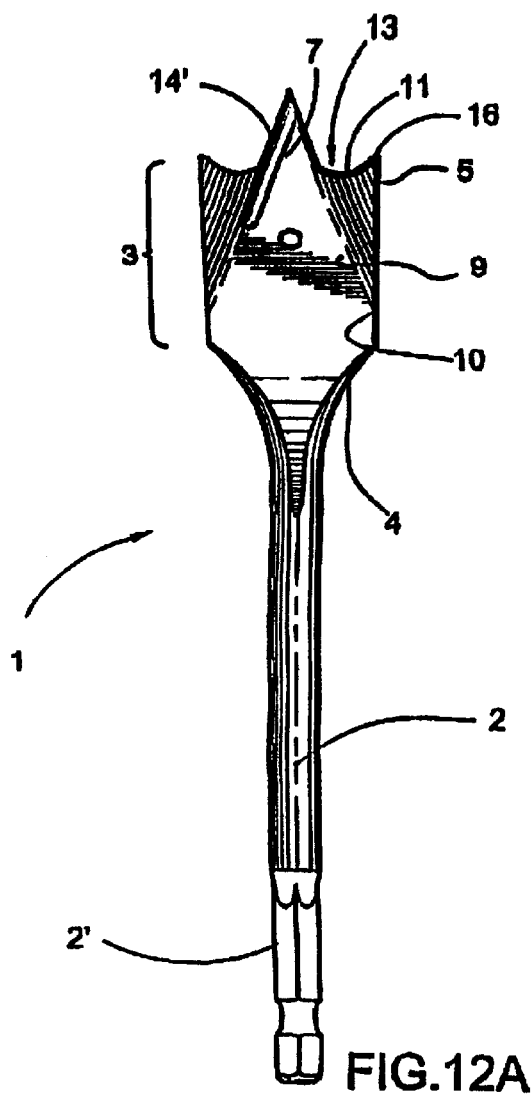
FIG. 12A is a plan view of a further embodiment of a spade drill bit according to the invention, showing a combination of the embodiments shown in FIGS. 3A and 5A.
Figure 12B:
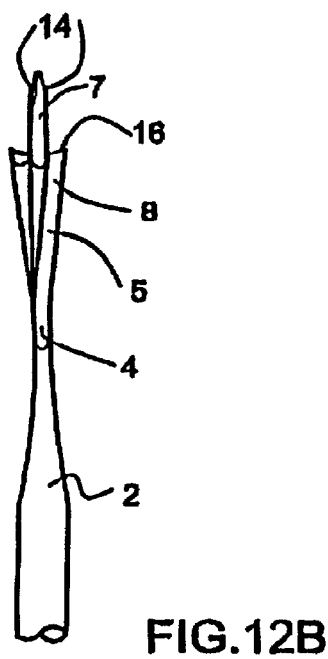
FIG. 12B is a side view of the spade drill bit of FIG. 12A.

FIGS. 12A to 12C shows an embodiment of a spade drill bit according to the invention, which combines the features shown in connection with FIGS. 3A and 5A previously.

Figures 4A, 4B, 4C, 4D:
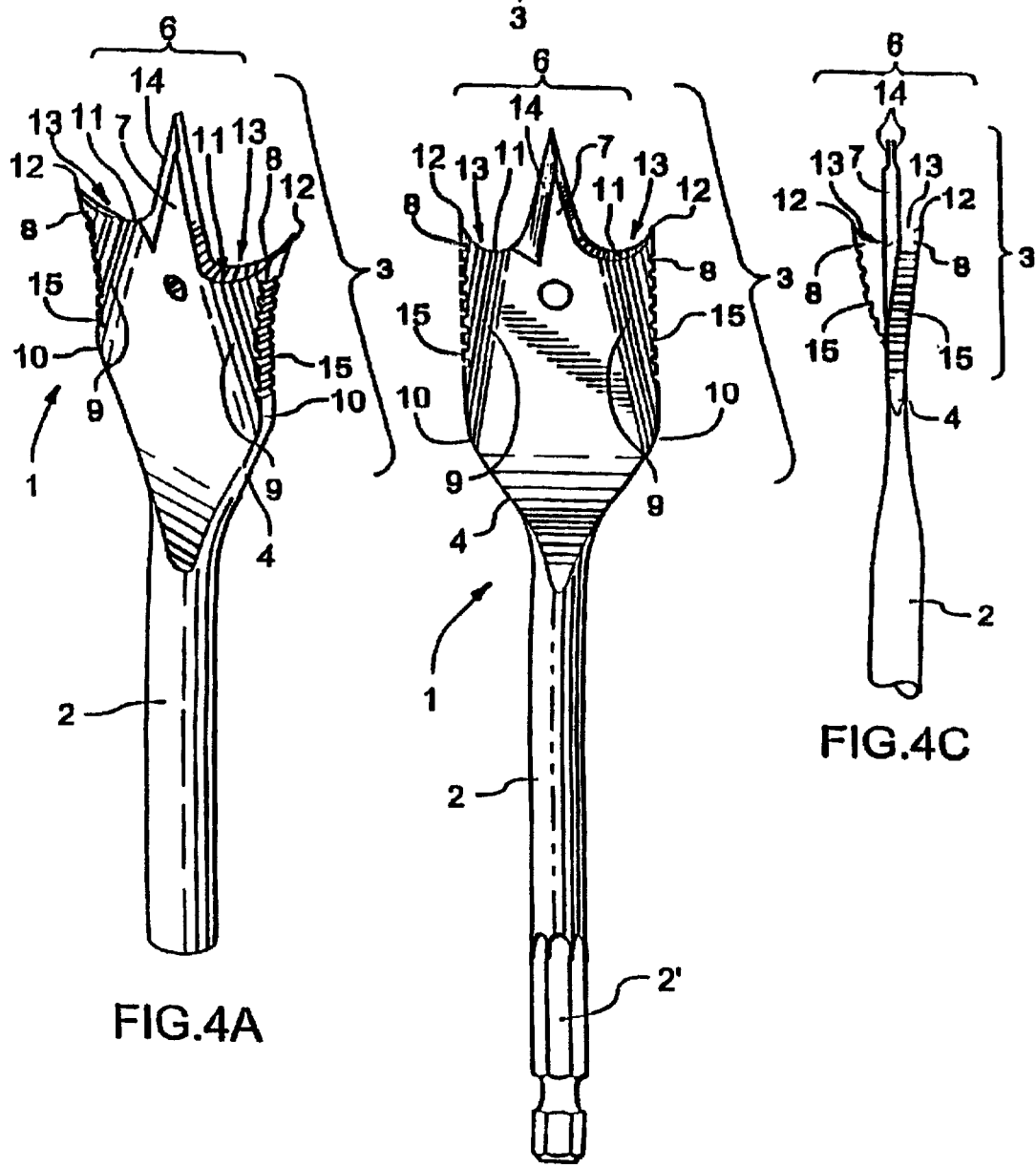
FIG. 4A is an elevational perspective view of a third embodiment of a spade drill bit according to the invention.
FIG. 4B is a plan view of the third embodiment of the spade drill bit of FIG. 4A.
FIG. 4C is a side view of the third embodiment of the spade drill bit of FIG. 4A.
FIG. 4D is a top view of the third embodiment of the spade drill bit of FIG. 4A.
Figure 13C:
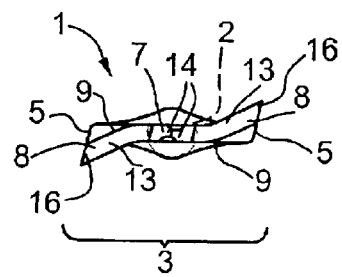
FIG. 13C is a top view of the spade drill bit of FIG. 13A.
Figure 13A:
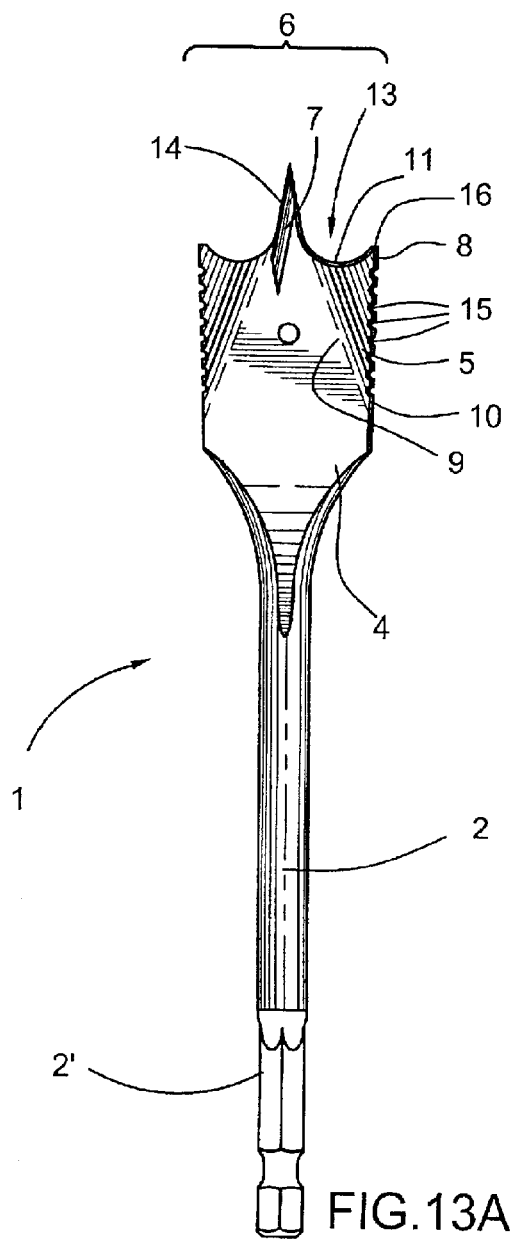
FIG. 13A is a plan view of a further embodiment of a spade drill bit according to the invention, showing a combination of the embodiments shown in FIGS. 3A and 4A.
Figure 13B:
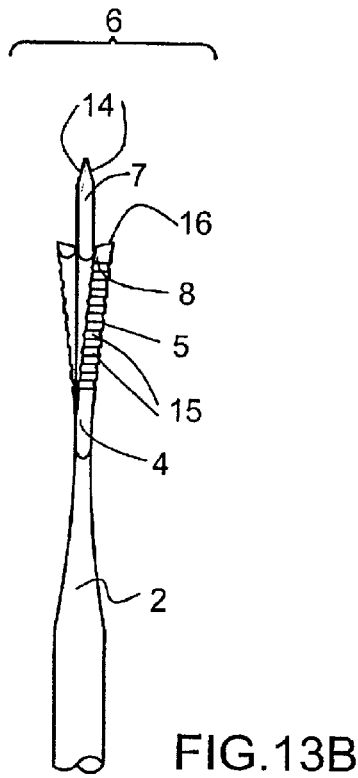
FIG. 13B is a side view of the spade drill bit of FIG. 13A.

FIGS. 13A to 13C shows an embodiment of a spade drill bit according to the invention, which combines the features shown in connection with FIGS. 3A and 4A previously.

Figure 14C:
FIG. 14C is a top view of the spade drill bit of FIG. 14A.
Figure 14A:
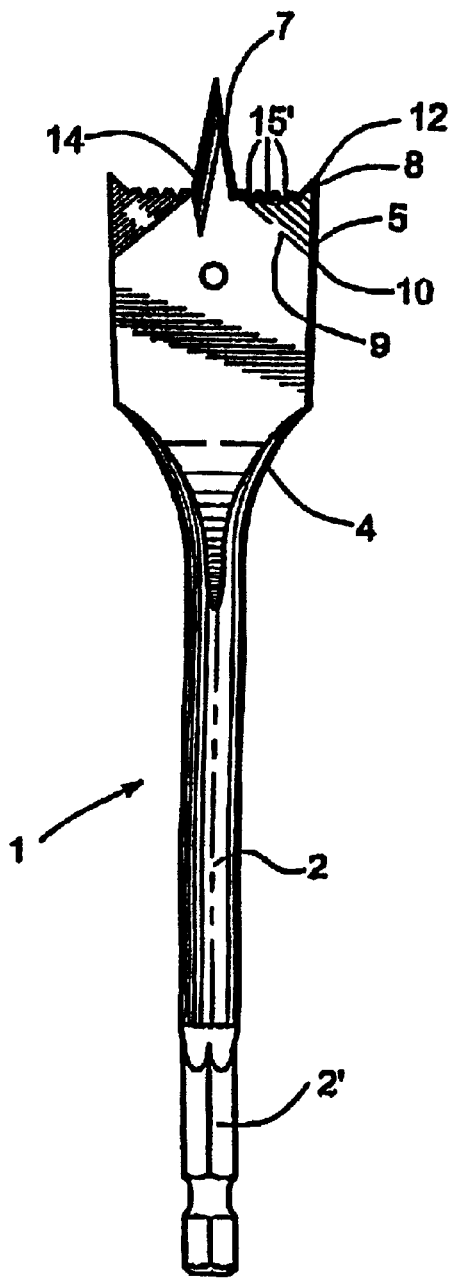
FIG. 14A is a plan view of a further embodiment of a spade drill bit according to the invention, showing a drill bit having serrated front cutting portions.
Figure 14B:
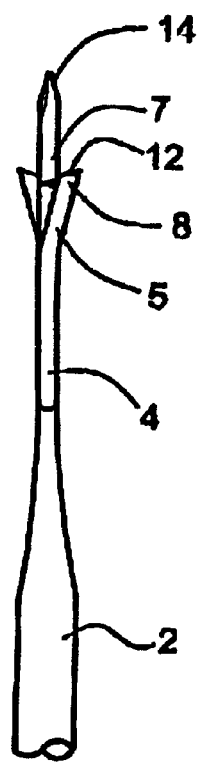
FIG. 14B is a side view of the spade drill bit of FIG. 14A.

A further embodiment of a spade drill bit 1 according to the invention is shown in FIGS. 14A to 14C. Reference numbers are as previously described, with the addition of front serrations 15' arranged on the front cutting edge of the drill bit. This facilitates the chip removal from the front cutting edge of the drill head. A combination of front serrations and side serrations (as shown in FIGS. 4A to 4D) is also envisioned, but not shown in the drawings.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed as the invention is:

1. A spade drill bit comprising:
   a shaft;
   a spade head portion arranged on said shaft, said head portion having a rearward facing bottom edge, two longitudinal sides and a forward facing cutting edge having a pointed, generally triangularly shaped tip and outer ends,
   wherein said longitudinal sides of said head portion are bent along a bend in a direction of rotation of said drill bit during operation, so that said outer ends are bent forwards in said rotating direction, and wherein said bend runs from a first position at one of said longitudinal sides or said bottom edge, to a second position at said cutting edge between said outer end and said tip,
   wherein said cutting edge comprises arced cutting portions arranged between said outer ends and said tip, said arced cutting portions being generally U-shaped.

2. The spade drill bit as recited in claim 1, wherein edge spurs are arranged at said outer ends of said cutting edge.

3. The spade drill bit as recited in claim 1 further comprising a stem portion for attachment to said shaft and to a hand or power tool.

4. The spade drill bit of claim 3 wherein said stem portion is manufactured by forging, a hot forming technique or a cold forming technique.

5. The spade drill bit as recited in claim 1, wherein said longitudinal sides comprise serrations.

6. The spade drill bit as recited in claim 2, wherein said longitudinal sides comprise serrations.

7. The spade drill bit as recited in claim 1, wherein said tip comprises reliefs arranged in the cutting direction.

8. The spade drill bit as recited in claim 1, wherein said shaft further comprises means for connecting said shaft to a hand or power tool.

9. The spade drill bit as recited in claim 2, wherein said tip comprise reliefs arranged in the cutting direction.

10. The spade drill bit as recited in claim 8 wherein said head portion is manufactured by a powder metallurgical process.

11. The spade drill bit as recited in claim 1, wherein said first position is arranged closer to said bottom edge than to said cutting edge.

12. The spade drill bit as recited in claim 7, wherein said reliefs are arranged along at least a portion of said bend.

13. The spade drill bit as recited in claim 9, wherein said reliefs are arranged along at least a portion of said bend.

14. The spade drill bit of claim 4 wherein said shaft and said second stem portion are pressed together and final-sintered.

* * * * *